(12) United States Patent
Herley

(10) Patent No.: US 7,162,084 B2
(45) Date of Patent: Jan. 9, 2007

(54) SYSTEM AND METHOD FOR AUTOMATICALLY DETECTING AND EXTRACTING OBJECTS IN DIGITAL IMAGE DATA

(75) Inventor: Cormac Herley, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 826 days.

(21) Appl. No.: 10/354,500

(22) Filed: Jan. 29, 2003

(65) Prior Publication Data

US 2004/0146198 A1   Jul. 29, 2004

(51) Int. Cl.
*G06K 9/34* (2006.01)

(52) U.S. Cl. .............. 382/173; 382/190; 382/203; 382/289; 382/291

(58) Field of Classification Search ........ 382/173, 382/174, 190, 203, 286, 289, 291
See application file for complete search history.

(56) References Cited

U.S. PATENT DOCUMENTS

| | | | | |
|---|---|---|---|---|
| 5,506,918 A | * | 4/1996 | Ishitani | 382/289 |
| 5,892,854 A | * | 4/1999 | de Queiroz et al. | 382/288 |
| 6,181,820 B1 | * | 1/2001 | Tachikawa et al. | 382/190 |
| 7,065,261 B1 | * | 6/2006 | Horie | 382/289 |

* cited by examiner

*Primary Examiner*—Phuoc Tran
(74) *Attorney, Agent, or Firm*—Lyon & Harr, L.L.P.; Craig S. Fischer

(57) ABSTRACT

An object detection and extraction system and method for processing digital image data. The system and method segregates objects contained within a single image and allows those objects to be considered as an individual object. In general, the object detection and extraction method takes an image containing one or more objects of know shape (such as rectangular objects) and finds the number of objects along with their size, orientation and position. In particular, the object detection and extraction method includes classifying each pixel in an image containing one or more objects to obtain pixel classification data, defining an image function to process the pixel classification data, and dividing the image into sub-images based on disparities or gaps in the image function. Each of the sub-images is processed to determine a size and an orientation for the each of the objects. The object detection and extraction system uses the above method.

41 Claims, 12 Drawing Sheets

SYSTEM AND METHOD FOR AUTOMATICALLY DETECTING AND EXTRACTING OBJECTS IN DIGITAL IMAGE DATA

TECHNICAL FIELD

The present invention relates in general to image processing and more particularly to a system and method for detecting and extracting objects of known shape (such as rectangular objects) but unknown number, size, orientation and position in digital image data (such as a scanned image).

BACKGROUND OF THE INVENTION

Optical scanners are popular peripheral devices for computers. Optical scanners are used to take objects containing printed information (such as text, illustrations or photographs) and convert the information into a digital form that a computer can use. In general, a user places objects to be scanned onto a platen of the scanner. A scanner head is passed over the platen area and the resultant image is divided into a plurality of pixels. Each pixel location is assigned a value that is dependent on the color of the pixel. The resulting matrix of bits (called a bit map) can then be stored in a file, displayed on a monitor, and manipulated by software applications.

A user will frequently have a need to scan multiple objects. By way of example, a user may want to scan multiple photographs, receipts or baseball cards. In order to save time, it is desirable to scan more than a single object at a time. Thus, the user will place multiple objects on the platen of the scanner and scan them in a single pass. This saves both time and energy, because the user does not have to repeat for each object the process of placing the objects on the scanner platen, closing the lid and interfacing with scanning software.

One problem, however, with scanning multiple objects simultaneously is that the objects are represented in the scanned image as a single bit map. This means that when the scanned image is saved as a file, displayed on a monitor, or manipulated by a software application the image is considered as a single image or object. Frequently, however, a user will want to save each object as a separate file. Some scanning applications do allow the user to manually select the boundaries of each object and save the object as a separate file. However, this process of manually segregating each object within the scanned image is repetitious, tedious and time consuming.

Therefore, what is needed is a simple and robust system and method for detecting and extracting objects from a scanned image. This system and method would allow a user to place multiple objects on a scanner, recognizes the number of objects on the scanner, and queries the user about whether he would like to store each object as a separate file. Such a system and method would make the scanning process quicker and more efficient and relieve the user of the burden of manual segmenting each object in the scanned image.

SUMMARY OF THE INVENTION

The invention disclosed herein includes an object detection and extraction system and method for processing digital image data. The system and method segregates objects contained within a single image and allows those objects to be considered as an individual object. Thus, each individual object can be saved as its own file or manipulated individually by a software application independent of the other objects contained in the scanned image. The system and method are especially useful in scanning applications. For example, a user can scan multiple objects (such as receipts or photographs) in a single pass and process the scanned image to allow each object to be saved as its own individual file. This occurs without the need for manual segmentation by the user.

In general, the object detection and extraction method takes an image containing one or more objects of know shape (such as rectangular objects) and finds the number of objects along with their size, orientation and position. Image functions are defined for each dimension of the image such that a multi-dimensional problem is effectively decomposed into two or more coupled one-dimensional problems. For example, a two-dimensional image can be decomposed into a first one-dimensional image function along the rows of the image and a second one-dimensional image function along the columns of the image. Each image function has the requirement that when the image contains only a single object, the function has a particular recognizable characteristic (such as a shape, color, or intensity). By way of example, if an image contains a single rectangular object and the image function is defined as a sum of all pixels contained on the object (or data pixels), then the image function will have a characteristic trapezoidal shape. In this manner, a single object of known shape can be identified along with its size, orientation and position.

Defining image functions having recognizable characteristics allows an image to be decomposed, divided or segmented into a plurality of sub-images. This division occurs along regions where there are gaps or disparities in the image function. This division of the image into sub-image and the sub-images into further sub-images continues until one of two occurrences. First, if it is determined after analysis that a sub-image (or the main image) contains a single object, the size, orientation and position of the object are determined and sent as output. The analysis involves recognizing the characteristic of the image function that identifies the object as a single object in the sub-image. In addition, the analysis involves finding inflection points on the image function that correspond to vertices of the single object in the sub-image. Second, if it is determined that a sub-image does not contain a single image but cannot be further divided, the method returns a message to the user stating that the number, size, orientation and position of the objects cannot be determined. This occurs only in a few situations, because the method is quite robust.

In particular, the object detection and extraction method includes classifying each pixel in an image containing one or more objects to obtain pixel classification data, defining an image function to process the pixel classification data. The image function is defined for two or more directions. In addition, the image function has a recognizable characteristic when it is used on a single object. For example, an image function that sums data pixels in a direction in an image has a trapezoidal shape when the object within the image is rectangular. The method further includes dividing the image into sub-images based on disparities or gaps in the image function. Each of the sub-images is processed to determine a size and an orientation for the each of the objects.

The object detection and extraction system uses the above method to process images. In particular, the system includes a data pixel detection module that classifies pixels and defines an image function, a segmentation module that is capable of dividing an image into smaller sub-images based on disparities or gaps in the image function, and a single object extraction module that processes the sub-images to detect a number, size, orientation and position of objects in the image.

BRIEF DESCRIPTION OF THE DRAWINGS

The present invention can be further understood by reference to the following description and attached drawings that illustrate aspects of the invention. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

Figure 1:
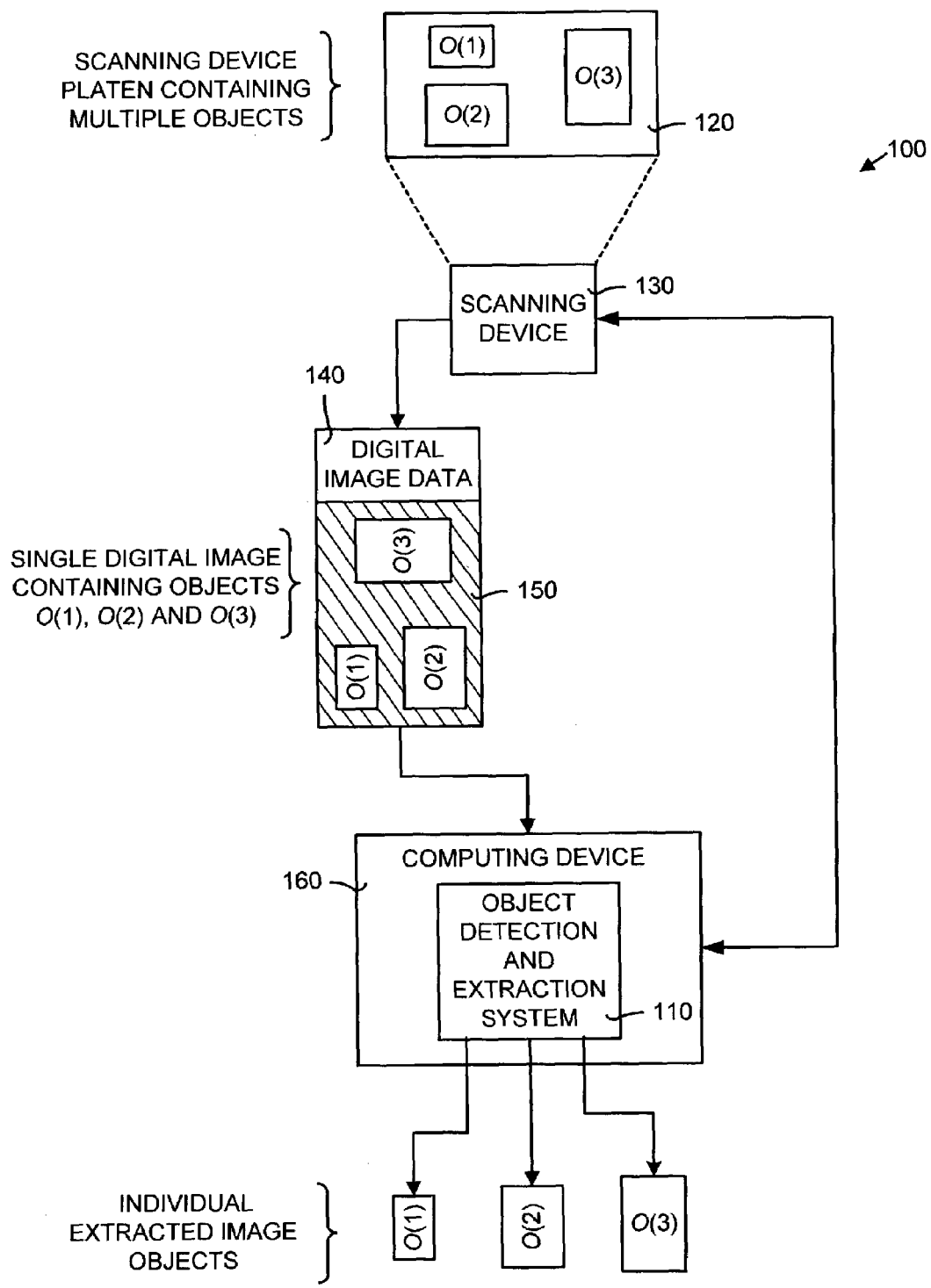
FIG. 1 is an overall block diagram of an exemplary implementation of an image processing system incorporating the object extraction system and method described herein.

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. General Overview

The object detection and extraction system and method described herein is capable of finding desired objects within digital image data and segregating those desired objects from other objects and any background. The system and method can automatically distinguish between multiple independent objects contained in a single scanned image. This allows each object to be considered its own individual object while still retaining the advantages of scanning multiple object in a single pass. Thus, each individual object can be saved as its own file or manipulated individually by a software application independent of the other object contained in the scanned image. For example, the system and method can distinguish between multiple photographs that are arranged adjacent each other when scanned by a single pass of a flatbed scanner.

In general, the object detection and extraction system and method is capable of detecting and extracting from an image objects having a known shape but of unknown size, orientation and number. This is achieved in part by defining an "image function" along each direction or dimension of the object. The image functions are a function of and representative of the data in the original image. By way of example, suppose that an image contains rectangular two-dimensional (2-D) objects. Suppose further that it is desired to determine the number of rectangular objects present in the image as well as each object's size, orientation and position. In order to determine this information, the object detection and extraction system and method defines two coupled one-dimensional (1-D) image characteristic functions. From these functions the number of objects and their size, orientation and position can be determined the majority of the time. Essentially, this is taking the 2-D problem and dividing it into two coupled 1-D problems to simplify the 2-D problem. As described in detail below, two 1-D problems can be used to solve the 2-D problem much easier that solving the entire 2-D problem directly.

Each image function has certain requirements. One requirement is that the function should have a particular recognizable characteristic when only a single object of a desired type is present in the image. For example, if the object types are rectangles and the object characteristic function is a sum of the pixels along a particular direction that are located within the objects (called data pixels), the recognizable characteristic is that the function is a trapezoid. Of course, other desired objects types and other object characteristic functions will yield other recognizable characteristics. Typically, the recognizable characteristic is a shape, but in other embodiments the characteristic may be, for example, a pixel color or pixel intensity.

The object characteristic function is calculated along two or more different directions and the image is divided into sub-images wherever gaps or disparities in the data pixels are present. These gaps are indicative of the absence of desired objects at that position along one of the directions. The sub-division of the sub-images continues in an iterative fashion until the recognizable characteristics of the object characteristic functions indicate one of two possibilities. The first possibility is that the sub-image contains a single desired object (such as a single rectangle). The other possibility a single desired object cannot be found and that no further sub-division is possible. If the latter occurs, the object detection and extraction system and method informs that user that the complete number, size, orientation and position of the desired objects cannot be determined. However, in the vast majority of cases the object detection and extraction system and method determines this information.

FIG. 1 is an overall block diagram of an exemplary implementation of an image processing system 100 incorporating the object detection and extraction system and method described herein. In general, digital image data is processed by an object detection and extraction system 110 to determine the number of objects and the size, orientation and position of each object contained in the digital image data. The system 110 achieves this by determining the boundaries of each object and automatically segregating the objects into separate image objects. This spares the user the time and effort of performing manual segregation of each object.

More specifically, as shown in FIG. 1, a user places multiple objects (such as photographs or receipts), O(1), O(2) and O(3), on a platen 120 of a scanning device 130 (such as a flatbed scanner). The dashed lines shown in FIG. 1 are to represent that the platen 120 is contained on the scanning device 130. The user then scans the objects positioned on the platen 120 and digital image data 140 is obtained. The digital image data 140 is a single digital image containing each of the objects (O(1), O(2) and O(3)) as well as background data 150. The background data, which is shown in FIG. 1 by the hatched lines, typically represents color of a lid (not shown) of the scanning device 130 that covers the platen 120 during the scanning process. In this exemplary implementation, it is assumed that the color of the background is known or can be estimated or determined.

The object detection and extraction system 110 is located on a computing device 160. As explained in detail below, the digital image data 140 is sent to the object detection and extraction system 110 and processed. The object detection and extraction system 110 finds each of the objects (O(1), O(2) and O(3)) within the digital image data 140 and extracts each object from the data 140. Once extracted, the objects are can be processed as separate image objects apart from the other objects and the background data 150.

II. Exemplary Operating Environment

The object detection and extraction system 110 is designed to operate in a computing environment. The following discussion is intended to provide a brief, general description of a suitable computing environment in which the invention may be implemented.

Figure 2:
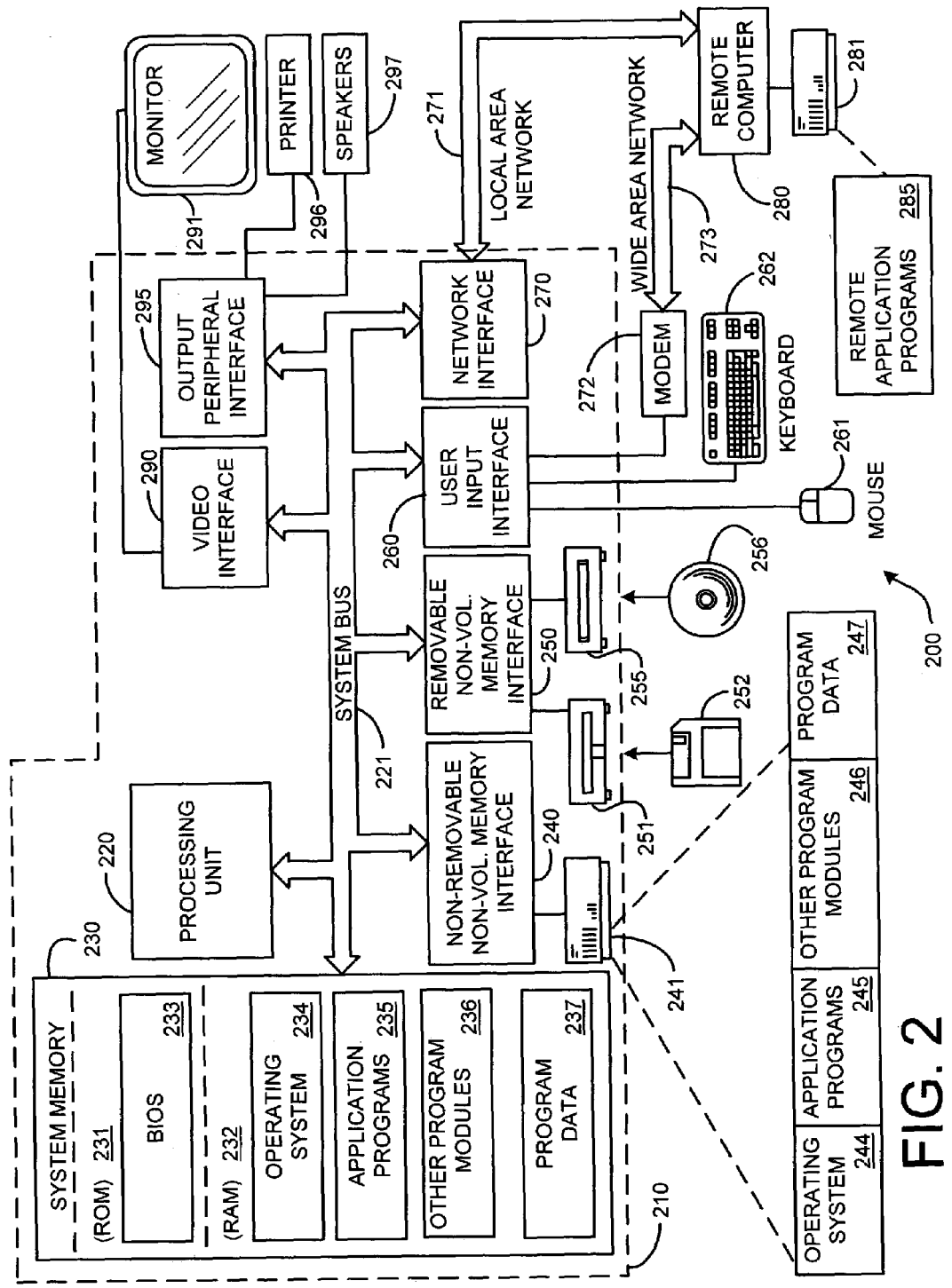
FIG. 2 is a general system diagram depicting a general-purpose computing device constituting an exemplary operating environment for the object detection and extraction system and method.

FIG. 2 illustrates an example of a suitable computing system environment 200 on which the object detection and extraction system and method may be implemented. The computing system environment 200 is only one example of a suitable computing environment and is not intended to suggest any limitation as to the scope of use or functionality of the invention. Neither should the computing environment 200 be interpreted as having any dependency or requirement relating to any one or combination of components illustrated in the exemplary operating environment 200.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 2, an exemplary system for implementing the invention includes a general-purpose computing device in the form of a computer 210. It should be noted that the computing device 160 shown in FIG. 1 is an example of the computer 210.

Components of computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 210. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices such as a keyboard 262 and pointing device 261, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 220 through a user input interface 260 that is coupled to the system bus 221, but may be connected by other interface and bus structures, such as, for example, a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 295.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

III. System Overview

Figure 3:
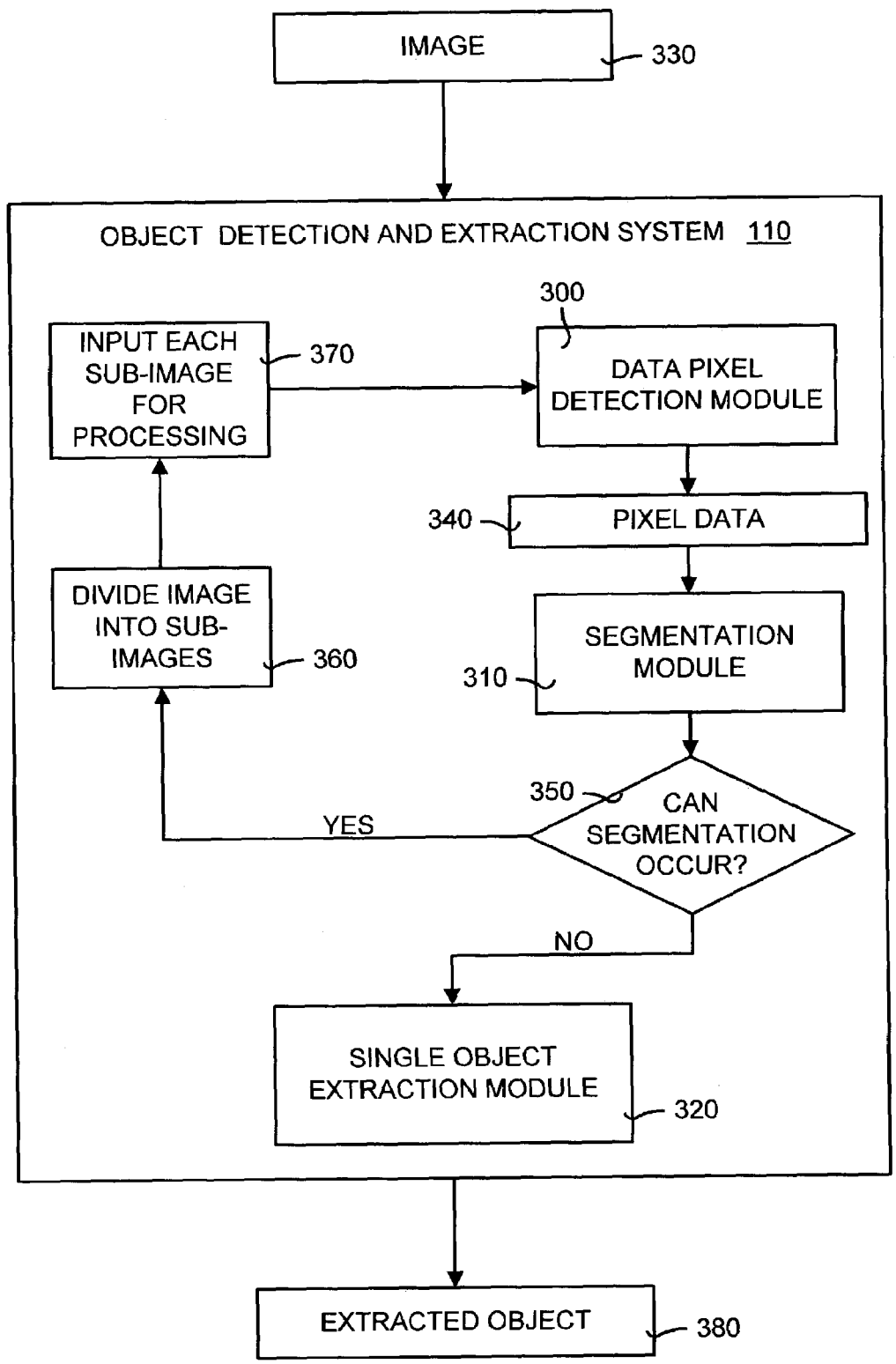
FIG. 3 is a block/flow diagram illustrating the components or modules of the object extraction system shown in FIG. 1.

The object detection and extraction system 110 includes a number of program modules that allow the system 110 to automatically distinguish between one or more objects in digital image data. By distinguishing between these objects, the number of objects along with each object's size, orientation and position can be determined. FIG. 3 is presented to illustrate the various modules of the object detection and extraction system 110 shown in FIG. 1 and to show their interaction. In particular, the object detection and extraction system 110 includes an data pixel detection module 300, a segmentation module 310, and a single object extraction module 320. Each of these modules and their interaction will now be discussed.

An image 330 is received by the data pixel detection module 300 (the digital image data 140 shown in FIG. 1 is one example of what the image 330 may contain). The data pixel detection module 300 analyzes and classifies each pixel within the image 330 to obtain pixel data 340. The pixel data 340 contains information such as whether a pixel is a data pixel or a background pixel. Data pixels are pixels that are located within any of the objects located in the image 330. On the other hand, background pixels are pixels that are outside the objects and in the background. In addition, the pixel data 340 includes information such as the number of data pixels along two or more directions of the image 330. The data pixel detection module also defines an image function to process the pixel data. For example, if the image function is defined to sum the data pixels in a direction of the image, the pixel data 340 will contain the number of data pixels along one axis of a coordinate system describing the image 330 and the number of data pixels along another axis of the coordinate system.

Next, the pixel data 340 is sent to the segmentation module 310. The segmentation module 310 determines whether there are any disparities or gaps in the image function and pixel data 340. As explained in detail below, these disparities usually are regions in the image 330 where there are few data pixels (relative to the surrounding regions) or no data pixels whatsoever. It is then determined whether the image 330 can be divided (box 350) based on whether disparities are found. If so, then the image 330 is capable of being divided and is divided along the corresponding disparity. This has the effect of breaking the image 330 into multiple pieces or sub-images (box 360). Each sub-image then is submitted to the data pixel detection module 300 for processing (box 370) and the iterative process begins again with the image 330 being replaced by a portion of the image 330 (i.e., each of the sub-images). This iterative process for each sub-image continues until one of two occurrences: (1) the system and method recognize that the sub-image contains only a single object. In this situation, the sub-image is sent to the single object extraction module 320 for processing; or (2) no further division of the sub-image is possible. In the latter situation, the system and method inform the user that the number, size, orientation and position of objects in the sub-image cannot be determined. However, the latter situation occurs infrequently, as the system and method is quite robust.

As stated above, if no disparities are present, then the portion of the image 330 that cannot be divided is sent to the single object extraction module 320. As described in detail below, the single object extraction module 320 processes the image 330 such that an object within the image 330 is detected and extracted and a number, size, orientation and position of the objects in the image 330 are found. The extracted object 380 is sent as output from the object detection and extraction system 110.

Figure 4:
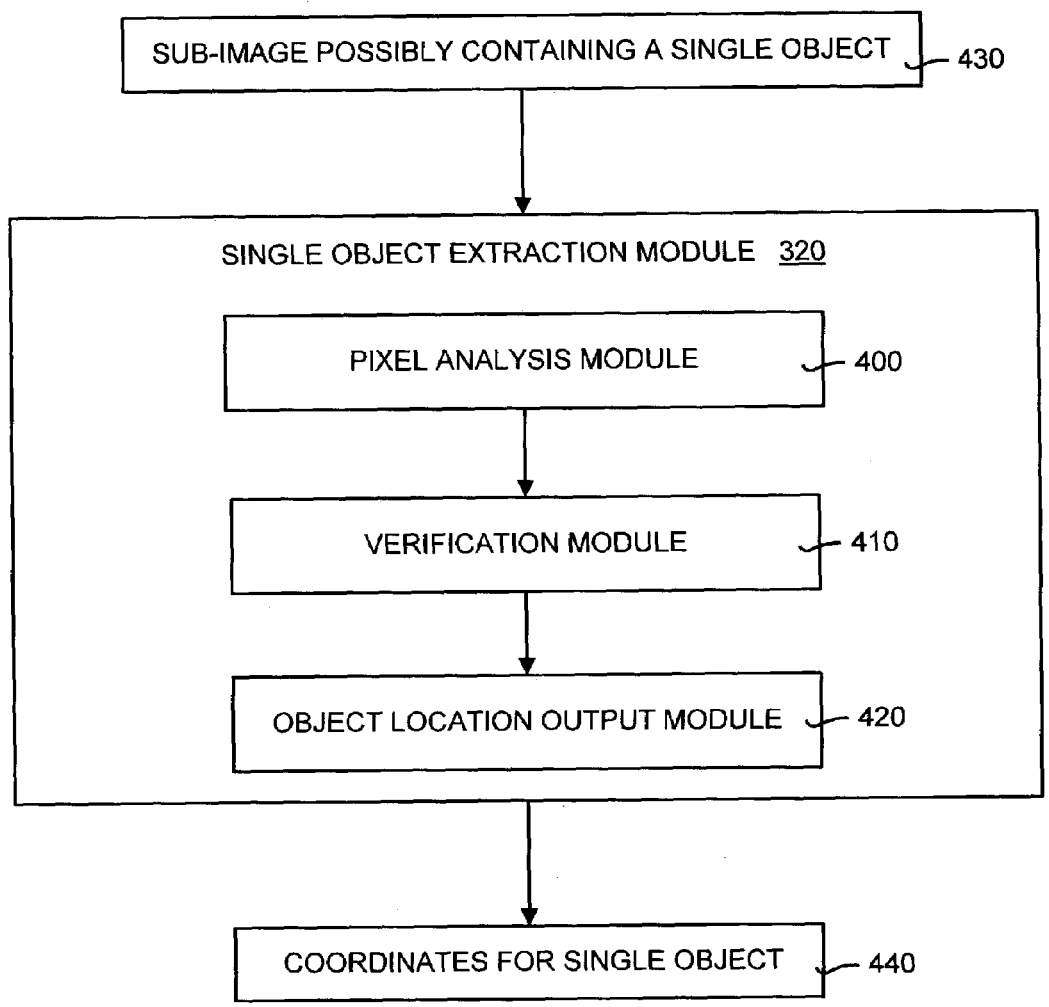
FIG. 4 is a block diagram illustrating the details of the single object extraction module shown in FIG. 3.

FIG. 4 is a block diagram illustrating the details of the single object extraction module 320 shown in FIG. 3. In general, the single object extraction module 320 examines a sub-image that may contain either a single object or no object at all and, if present, locates the object. The module 320 processes each sub-image from the main image 330 after it has been determined that the sub-image cannot be divided any further. Alternatively, the module 320 processes the main image if it is determined that the main image 330 cannot be divided.

The single object extraction module 320 includes an pixel analysis module 400, a verification module 410 and an object location output module 420. A sub-image 430 that possibly contains a single object is received by the pixel analysis module 400 and pixel data is generated. Based on the pixel data, estimated coordinates of the location of an object within the sub-image 430 is calculated. The estimated coordinates are send to the verification module 410. The verification module 410 compares each of the estimated coordinates with the main image 330 of which the sub-image 430 is a part. Note that it is possible that the image 330 can be the same as the sub-image 430. The comparison is used to determine whether any of the estimated coordinates are a plausible fit with the image 330 and verify the existence of an object in the sub-image 430. If a plausible fit is found, the then the correct coordinates are sent to the object location output module 420 and then sent as output (box 440). From the coordinates, the object can be segregated and extracted from the sub-image 430. If a plausible fit is not found, then the object location output module 420 is informed of this by the verification module 410. In this case, the object location output module 420 does not output the coordinates of the single object but instead outputs a message stating that an object could not be found in the sub-image 430.

IV. Operational Overview

The object detection and extraction system 110 describes above uses an object detection and extraction method describes herein to process digital image data (such as a scanned image) and distinguish between any objects in the data. The number of objects in the image data and the size, orientation and position of each of the objects is determined by the method. For a single object in the image data, the method includes using calculating data pixels within the image and using the calculations to determine the coordinates of the object. The method can also be extended for use on digital image data that contains a plurality of objects. In this case, the method includes locating and segregating each object by recursively decomposing the image into sub-images. This decomposition continues until each sub-image either contains a single object or cannot be further decomposed. By decomposing the image containing multiple objects into smaller sub-images that contain a single image, the method of finding single objects can be applied even in multiple object situations.

Figure 5:
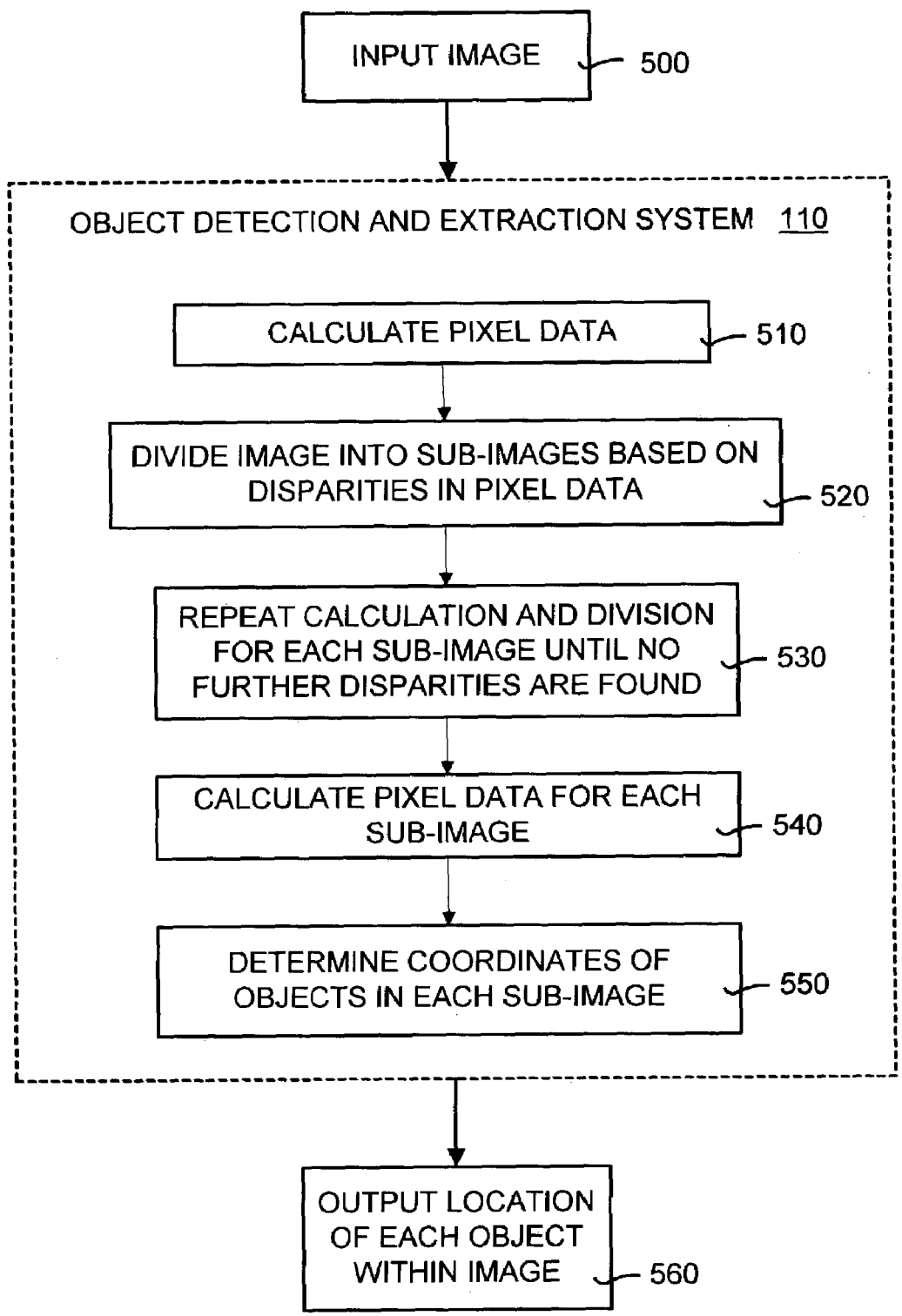
FIG. 5 is a general flow diagram illustrating the operation of the object detection and extraction system shown in FIGS. 1 and 2.

FIG. 5 is a general flow diagram illustrating the operation of the object detection and extraction system 110 shown in FIGS. 1 and 2. This description applies for both the single object case and the multiple object case. Specifically, the operation begins by inputting an image (box 500) and classifying pixels within the image (box 510). As stated above, a data pixel is a pixel contained within or on the boundary of an object, while a background pixel is a pixel not on the object. Next, an image function is defined in order to process the classified pixels (box 520). An image function is defined in two or more different directions. In one embodiment, one-dimensional image functions are defined that sums all the data pixels in a first direction and sums all the data pixels in a second direction. In another embodiment, the first direction corresponds to rows of the image and the second direction corresponds to columns of the two-dimensional image.

Next, the image is divided (or segmented or decomposed) based on gaps or disparities the image function (box 530). One example of a disparity in the image function is a row or column in a two-dimensional image where the number of data pixels is zero or small compared to neighboring rows or columns. These types of disparities occur between rows (or columns) where the number of data pixels is high. For example, a disparity may be a gap where the number of data pixels is low occurring in the midst of cases where the number of data pixels is high. If several consecutive rows (or columns) have a low number of data pixels, this is considered as a single gap. In this case one of the rows (or columns) can be designated as the position of the disparity. If disparities are found, the image is divided into separate sub-images along lines of disparity. For example, if a certain row in the image contain zero number of data pixels, a line of disparity would be generated along that row. The image then would be divided into two sub-images along that row, such that a first sub-image would be generated on one side of the row and a second sub-image would be generated on the other side of the row. If no disparities are found, this means either that the image contains a single object or that it cannot be determined whether an object is present.

If image can be divided into sub-images, each sub-image is process to determine a number, size, orientation and position of objects in the main image (box 540). This processing of sub-images is iteratively repeated. This recursive process is continued until no further disparities can be found. The number, size, orientation and position of objects in the form of the location of each object (as described by coordinates of the object) then is sent as output (box 550).

In the event that the image contains a single object, boxes 530 and 540 are skipped. In other words, image functions are defined for the image (box 520) and the coordinates of the object within the image are determined and sent as output (box 550).

Figure 6:
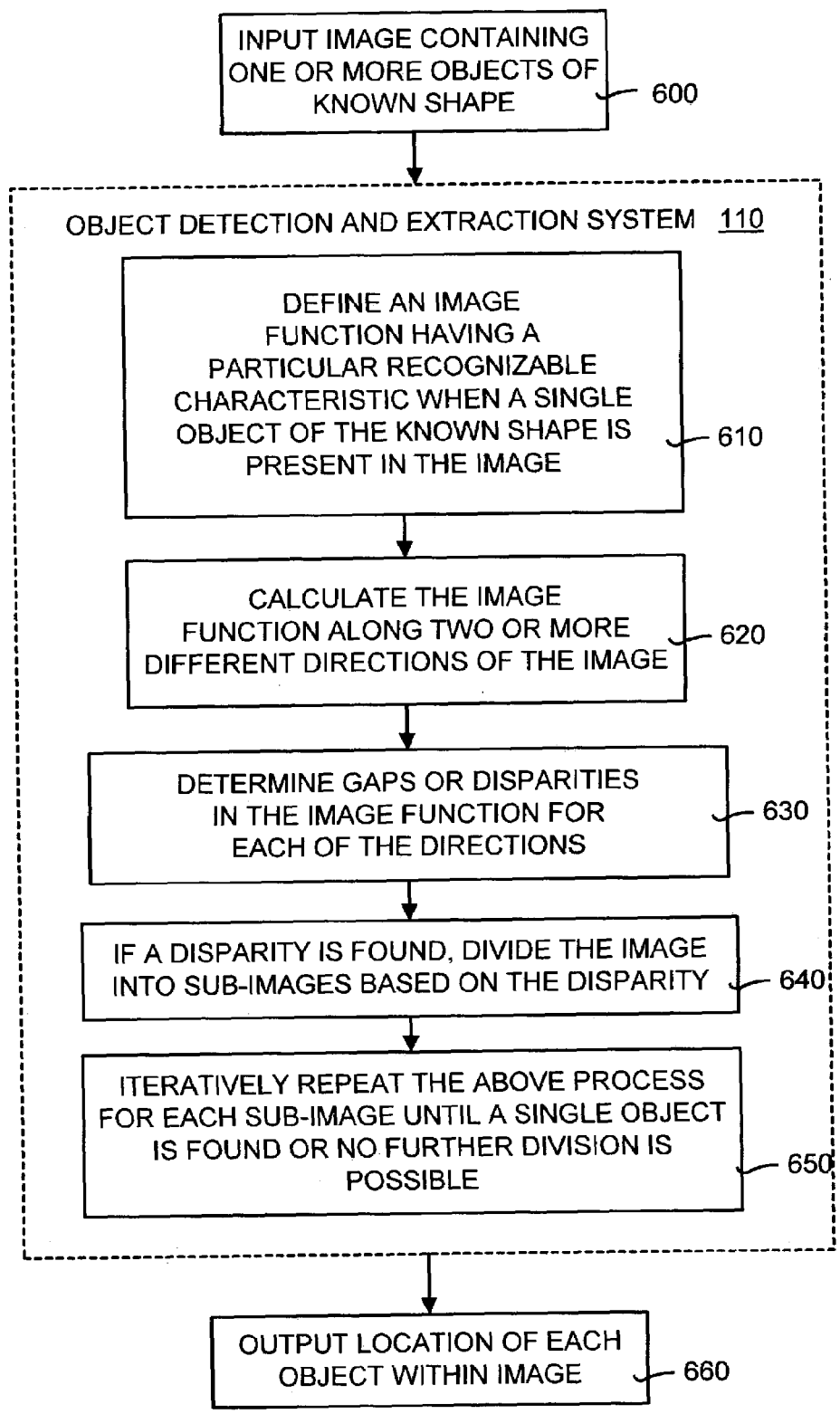
FIG. 6 is a general flow diagram illustrating further detail of the object detection and extraction process shown FIG. 5.

FIG. 6 is a general flow diagram illustrating further detail of the object detection and extraction process shown FIG. 5. In particular, an image 600 containing one or more objects of known shape are input into the object detection and extraction system 110. In one embodiment, the image 600 is a scanned image. In another embodiment, the image 600 contains one or more objects that are approximately a rectangular shape.

Next, an image function is defined (box 610). The image function has the property that the function has a particular recognizable characteristic when a single object of the known shape is present in the image. For example, if the image function sums all the data pixels along the rows of an image and the image contains an approximately rectangular object, the recognizable characteristic is that the shape of the image function is approximately a trapezoid. Next, the image function is calculated along two or more different directions of the image (box 620). By way of example, if the image is a two-dimensional image the image function may be calculated along the rows and columns of the image.

An analysis then is performed to determine whether any gaps or disparities are present in the image function (box 630). This analysis is performed in each of the directions. If a disparity is found, then the image 600 is divided into sub-images based on the disparity (box 640). Then each of the sub-images is processed in an iterative process (box 650). This iterative process continues for each sub-image until the sub-image contains only a single object or no further division of the sub-image is possible. The sub-image cannot be divided if there are no disparities found in the image function. If one or more objects are found by this process in the image 600, the object detection and extraction system 110 outputs the location of each object (box 660).

V. Operational Details and Working Examples

Figure 7:
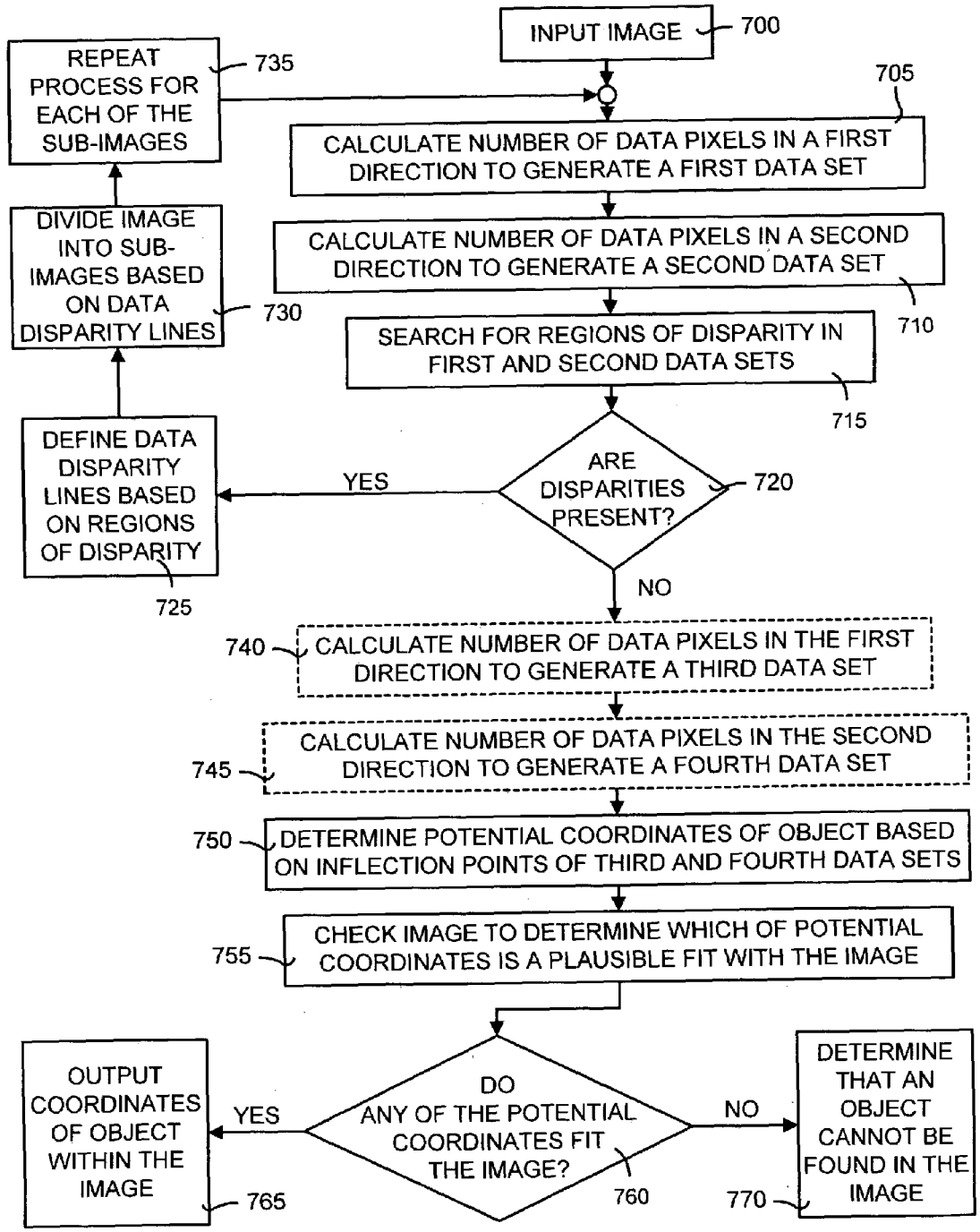
FIG. 7 is a flow diagram illustrating the details of the object detection and extraction method shown in FIGS. 5 & 6.

The object detection and extraction method can be used to process an image that contains a single object as well as multiple objects. FIG. 7 is a flow diagram illustrating the details of the object detection and extraction method shown in FIGS. 5 and 6. Referring to FIG. 7, an image is received as input (box 700). The number of data pixels in a first direction are calculated to generate a first data set (box 705). Similarly, the number of data pixels in a second direction are calculated to generate a second data set (box 710). By way of example, the image is typically a scanned rectangular image containing rows and columns of pixels. In addition, in a vast majority of situations the objects contained in the image are rectangular objects (such as photographs or receipts). In addition, the image function can be defined as the sum of the data pixels in a direction. In this situation, the number of data pixels in a row are calculated for every row in the image. Similarly, the number of data pixels in a column are calculated for every column of the image. The first data set contains the distribution of data pixels over the rows of the image and the second data set contains the distribution of data pixels over the columns of the image.

Next, the first and second data sets are searched (box 715) to determine if any regions of disparity are present (box 720). These disparity regions, or gaps, are areas in the image where there are few or no data pixels. If disparities are present, then a data disparity line is defined along the regions of disparity (box 725). For example, if a row in the image contains no data pixels a data disparity line is defined along that row. Based on the data disparity line, the image is divided or segmented into sub-images (box 730). This division means that one of the sub-images is above the data disparity line and one of the sub-images is below the disparity line. Once these sub-images are created, they are treated as separate images apart from the input image from which they came. Each sub-image then is processed again individually (box 735). Thus, boxes 705, 710, 715 and 720 are repeated in an iterative process for each sub-image.

If one of the sub-images being processed has no disparities present, then the sub-image individually is processed again. This involves calculating the number of data pixels within the sub-image in the first direction using the image function to generate a third data set (box 740). In addition, the number of data pixels in the second direction are calculate to generate a fourth data set (box 745).

It should be noted that if no disparities are found in the initial (or first) iteration of the method then boxes 740 and 745 will not need to be performed. This is because the number of data pixels in the first direction and the number of data pixels in the second direction will already have been calculated for the image in boxes 705 and 710. Thus, the first data set will equal the third data set and the second data set will equal the fourth data set. This is denoted in FIG. 7 by the dotted boxes outlining box 740 and 745.

Once the pixel data has been calculated, inflection points of the data are used to determine potential coordinates of the object (box 750). As explained in the working example below, there may be more than one object corresponding to the pixel data. For this reasons, the potential coordinates are checked against the input image to determine which (if any) of the potential coordinates is a plausible fit with the input image (box 755). If the determination (box 760) is positive and one set of the potential coordinates is a plausible fit, then those coordinates are sent as output (box 765). Once the coordinates and location of an object within the image is known, the object can be segregated and extracted from the image. If there is no plausible fit of the potential coordinates to the image, then it is determined that an object cannot be found in the image (box 770).

In order to illustrate the details of the object detection and extraction method, two working examples will now be presented.

Single Object Case

Figure 8:
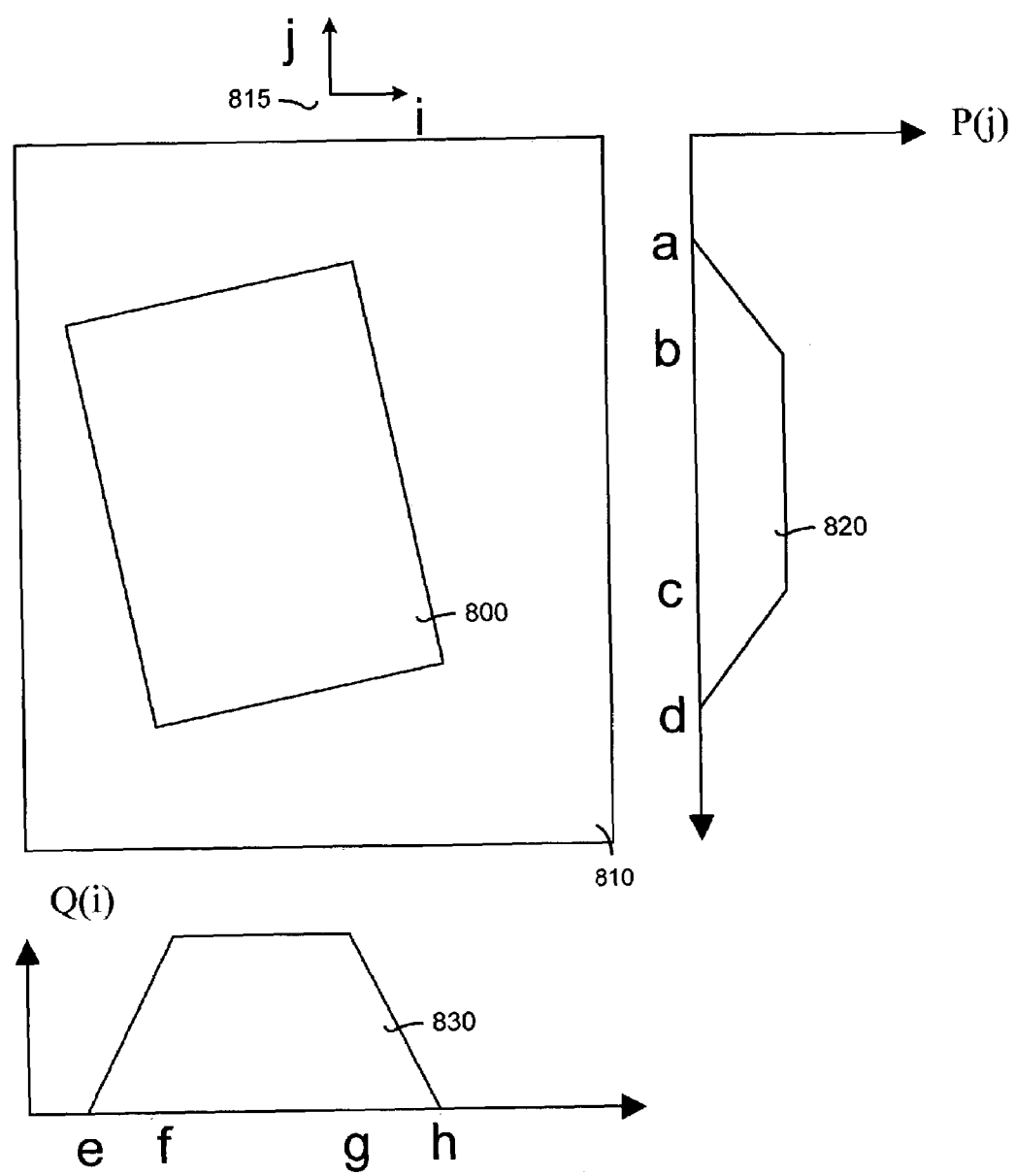
FIG. 8 illustrates a first working example of using the object detection and extraction method to find a single object in an image.

In a first working example, it is demonstrated that if an image contains a single object that the invention described herein can easily extract the object through detection and segregation. FIG. 8 illustrates an object 800 within a scanned image 710. In this working example, the object 800 is a rectangular object, such as a receipt. In addition, it is known that the scanned image 810 contains a rectangular object. However, the size, orientation and position of the object 800 is unknown.

The first step in extracting the object is to classify each pixel in the scanned image 810 as either a background pixel or a data pixel. In this working example, the classification is performed by examining the color of each pixel. A background pixel is a pixel that is located outside of the object 800. On the other hand, a data pixel is a pixel that is located within the object 800. It is assumed that the color of the background b (i.e. the value of pixels exterior to the object 800) is known or can be estimated. In addition, it is assumed that at least a majority of the pixels with in the object 800 differ from b by more than a threshold amount. In mathematical terms, any pixel in the scanned image 810 for which, $$|Im(i,j)-b|>\text{threshold}$$

is defined as a data pixel and all other pixels are defined as background pixels.

Next, a summation is performed of the data pixels using axes established on the scanned image 810. In this working example, a two-dimensional orthogonal coordinate system 815 was established on the scanned image 810 such that an i axis corresponds to the horizontal direction (or rows) and a j axis corresponds to the vertical direction (or columns). First, the number of data pixels in each row was calculated. This was accomplished by summing the number of data pixels along the i axis for a fixed j value, designated as P(j) (where P(j) is the image function in the rows or x direction).

This is performed for all values of j. The resultant graph for P(j) (the summation of data pixels in the $j^{th}$ row) is a first trapezoidal shape 820. Second, the number of data pixels in each column was calculated. The number of data pixels was summed along the j axis for a fixed i value, designated as Q(i) (where Q(j) is the image function in the columns or y direction). This is performed for all values of i. The resultant graph for Q(i) (the summation of data pixels in the $i^{th}$ row) is a second trapezoidal shape 830.

Elementary geometry then was used on the first and second trapezoidal shapes 820, 830, as shown in FIG. 8. From this geometry, it follows that the top part of the graph of P(j) is equal to x cos(theta) and that the top part of the graph of Q(i) is equal to y sin(theta), where x and y are the dimensions of the object 800 and theta is the angle at which it is oriented. The corners of the object 800 are the four coordinate points (g,a), (h, c), (f,d) and (e,b), which correspond to the inflection points of the first trapezoidal shape, P(j), and the second trapezoidal shape, Q(i).

Figure 9:
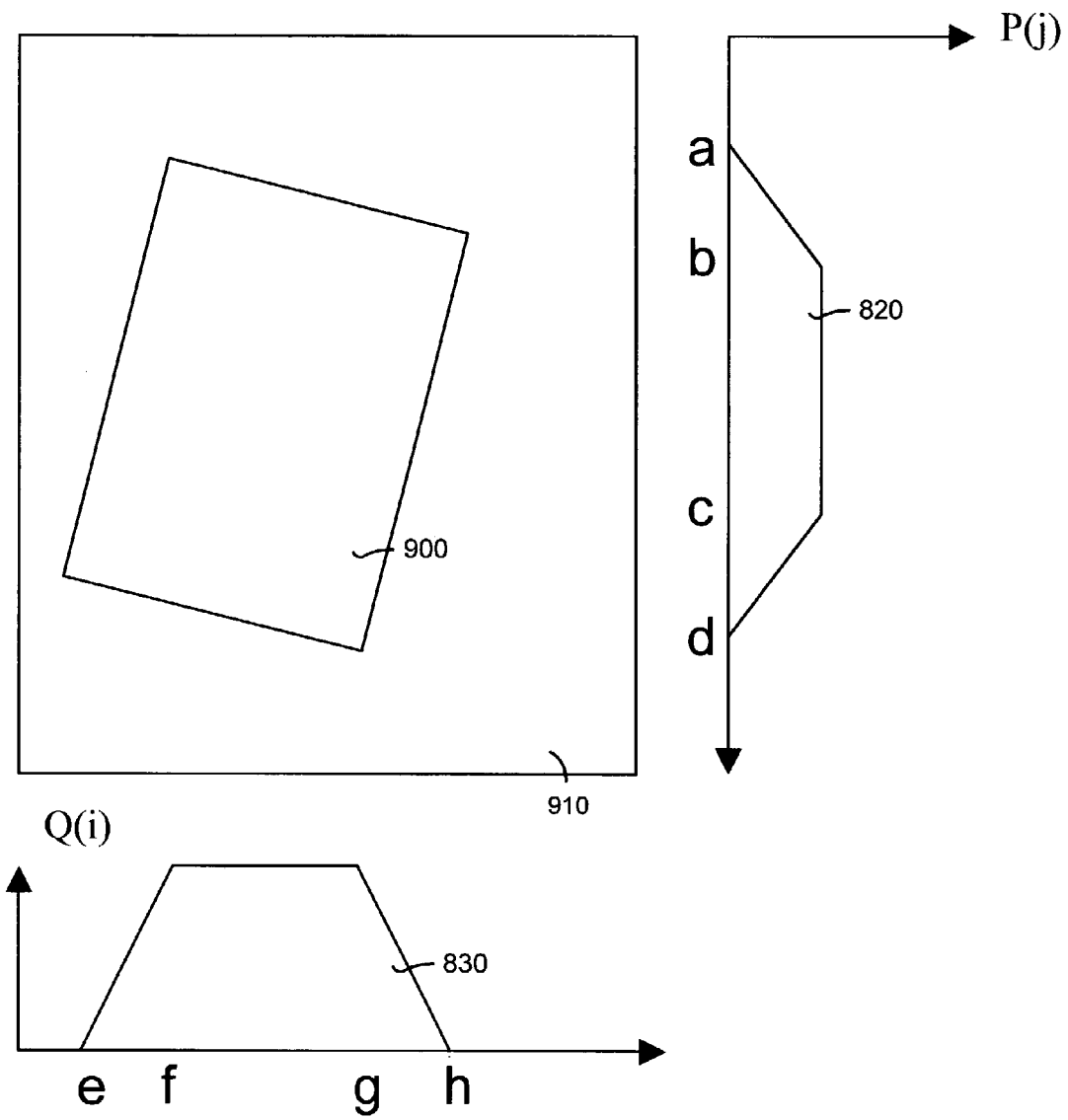
FIG. 9 illustrates an object having the same size but different orientation as the object in FIG. 8.

It should be noted that there is another situation in which an object in the scanned image 810 would yield the same graph of P(j) (the first trapezoidal shape 820) and the same graph of Q(i) (second trapezoidal shape 830). This possibility is shown in FIG. 9. In this situation, a second object 900 is located within a second scanned image 910. The second object 900 has the same size of the first object 800 shown in FIG. 8, but has an inverse orientation (i.e., the second object 900 is oriented at angle (−theta) instead of angle (theta). The second object 900 has coordinates (h,b), (g,d), (e,c) and (f,a) and is the only other possible object that would generate the identical trapezoidal shapes 820, 830 shown in FIGS. 8 and 9.

In this single object case, it can be determined that either the first object 800 or the second object 900 are present in the scanned images 810, 910. However, a check must be made as to which object is present. In order to determine which object is present, the vertices for each object are checked against the scanned image data. The object that best fits the data then is used and the other object is discarded. In other words, each rectangle is analyzed to determine that a rectangle of that size, position and orientation actually contain almost all of pixels for which |Im(i,j)−b|>threshold.

Multiple Object Case

Figure 10:
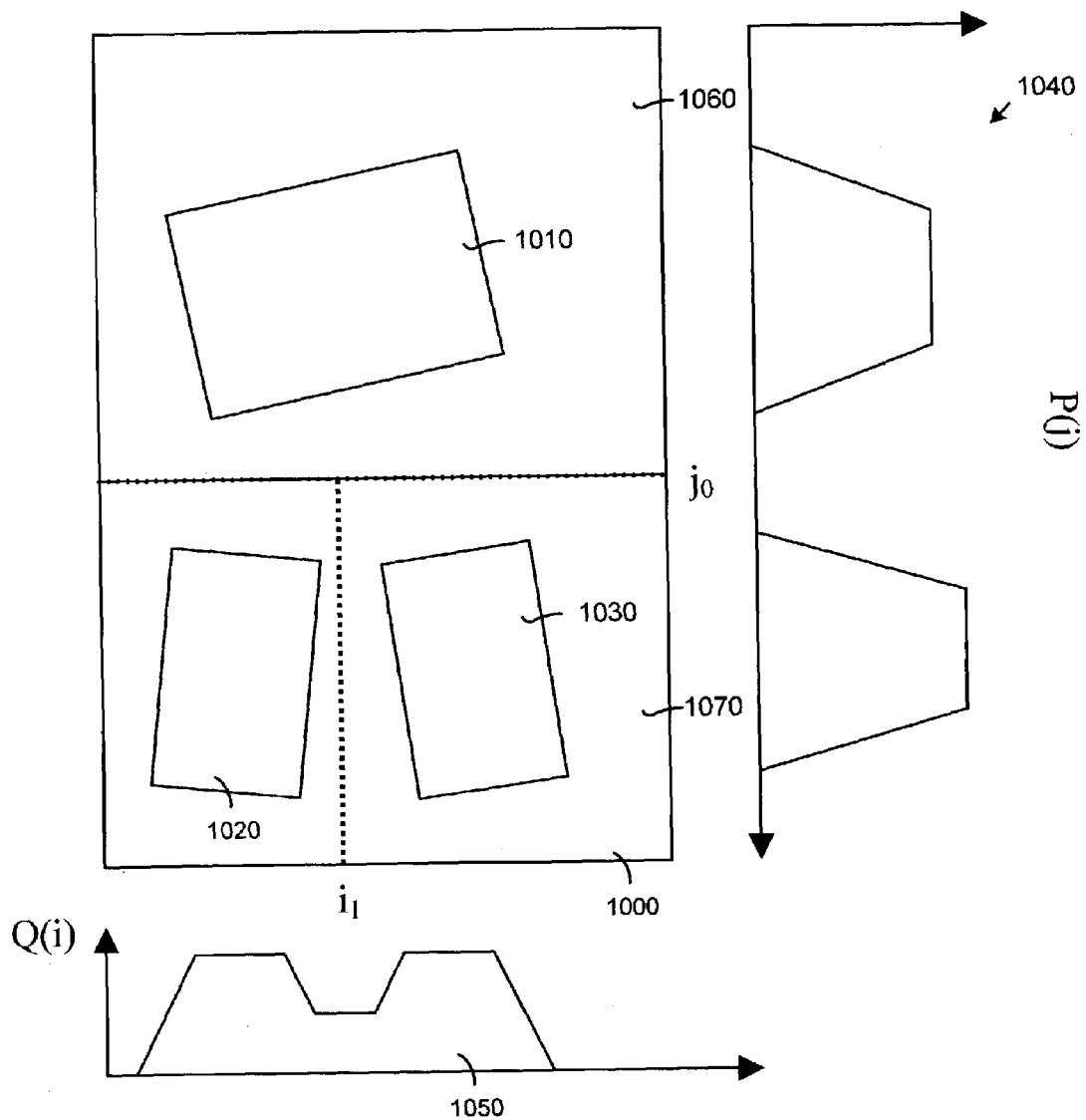
FIG. 10 illustrates a second working example of using the object detection and extraction method to find multiple objects in an image.

The object extraction method disclosed above for a single object case can be extended to a multiple object case. In general, this involves breaking the multiple object case into a plurality of single object cases, which can be solved as describe above. As shown in FIG. 10, in this second working example the scanned image 1000 includes multiple objects, namely, a first object 1010, a second object 1020 and a third object 1030. In this multiple object case, the same object extraction method disclosed above is used but in a recursive manner.

Specifically, similar to the single object case, each pixel in the scanned image 1000 was classified as either a data pixel or a background pixel. This classification was performed based on pixel color. Next, an image was defined as the sum of the data pixels in a certain direction. In this working example, a summation of data pixels along the axes was calculated and a resultant graph for P(j) (the summation of data pixels in the $j^{th}$ row) is a first trapezoidal shape 1040 and the resultant graph for Q(i) (the summation of data pixels in the $i^{th}$ row) is a second trapezoidal shape 1050. It should be noted that in this case when the scanned image 1000 consists of multiple objects, the quantities P(j) and Q(i) will consist of the sums of the trapezoidal shapes 1040, 1050 generated by each of the individual objects.

It would be difficult to estimate the parameters of the trapezoidal shapes 1040, 1050 without some simplification. Observe, however, that in the first trapezoidal shape 1040 (the P(j) graph there is a disparity in the data (or gap) at $j_0$, which is a location where P(j) is equal to zero. This indicates that there is no image data at this location and thus the portions of the scanned image 1000 above and below row $j_0$ are treated separately. Taking advantage of this fact, the object detection and extraction method divides the scanned image 1000 into two sub-images: (1) the top sub-image 1060 (the rows above $j_0$); and (2) the bottom sub-image 1070 (the rows below $j_0$).

Figure 11:
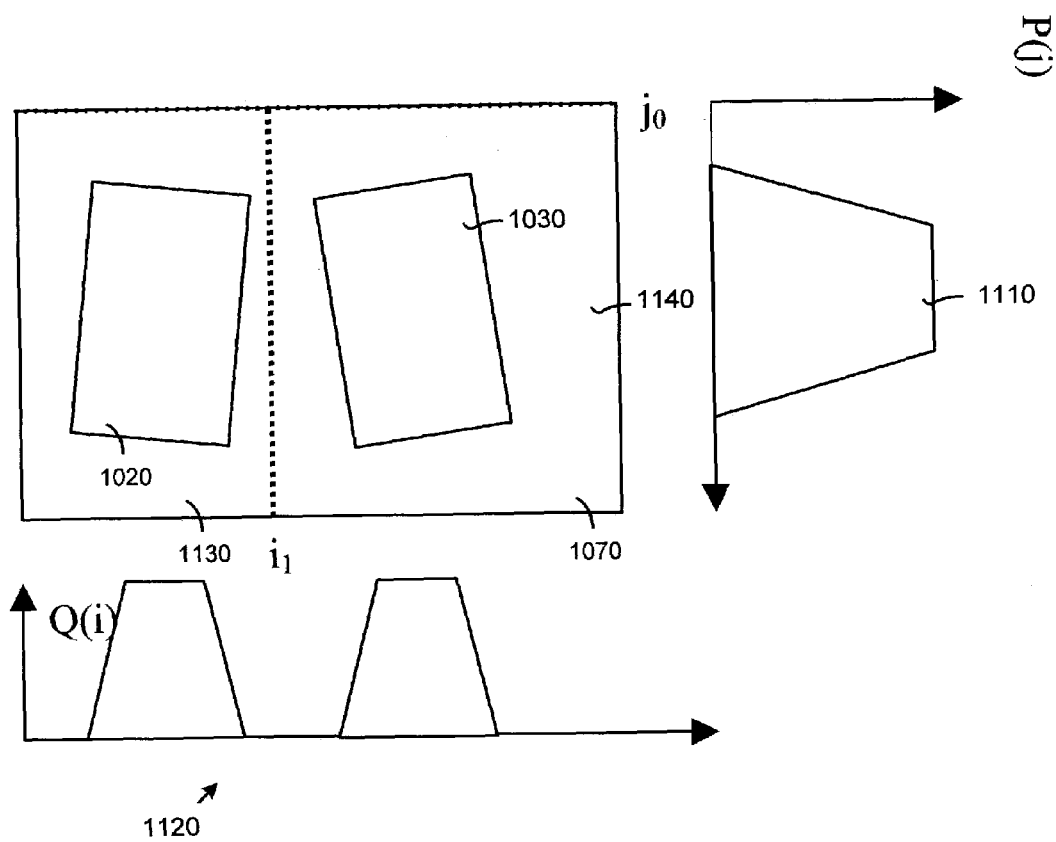
FIG. 11 illustrates the processing of a sub-image of the image shown in FIG. 10.
Figure 12C:
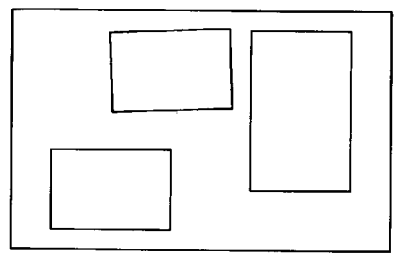
FIGS. 12A–F illustrate several configurations of objects within images on which the object detection and extraction method can be used.
Figure 12F:
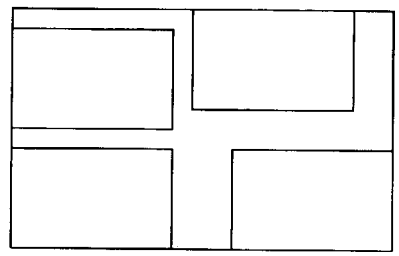
Figure 12B:
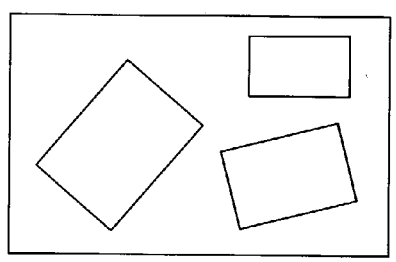
Figure 12E:
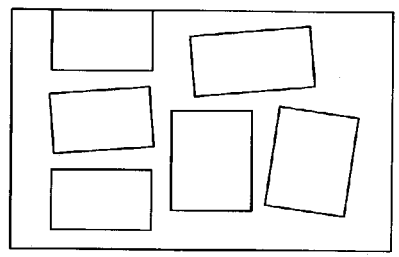
Figure 12A:
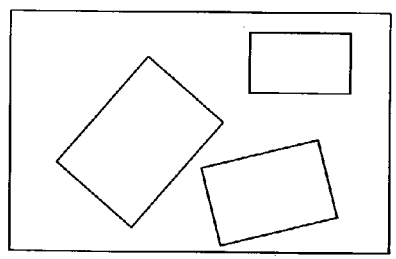
Figure 12D:
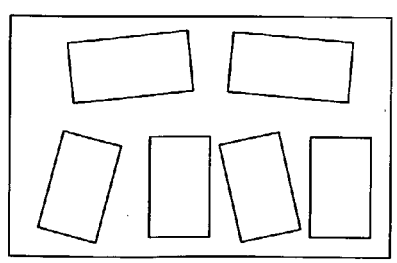

Once the scanned image 1000 is divided, the object detection and extraction method described above is used again to process each of the sub-images 1060, 1070. In particular, the image function in both direction (P(j) and Q(i)) are calculated over the top sub-image 1060 and the bottom sub-image 1070. Referring to FIG. 10, it can be seen that the top sub-image 1060 contains a single rectangle (the first object, 1010) such that the problem decomposes into the single object case described above. Thus, the coordinates of the first object 1010 are found such using the method described above for the single object case The bottom sub-image 1070 includes the second object 1020 and the third object 1030. Performing another iteration of the object detection and extraction method, each pixel within the bottom sub-image 1070 is classified as either a data pixel or a background pixel based on pixel color. The processing for this iteration is shown in FIG. 11. In particular, the quantities for P(j) and Q(i) were calculated. A resultant graph for P(j) is a first trapezoidal shape 1110 and the resultant graph for Q(i) is a second trapezoidal shape 1120. As shown in FIG. 11, there is a data disparity (or gap) in Q(i) at location $i_1$. This indicates that this bottom sub-image 1070 can be divided into even further sub-images by taking those columns to the left of $i_1$ (the left sub-sub-image 1130) and those to the right of $i_1$ (the right sub-sub-image 1140).

It can be seen from FIG. 11 that both the left sub-sub-image 1130 and the right sub-sub-image 1140 contain a single object. Specifically, the left sub-sub-image 1130 only contains the second object 1020 and the right sub-sub-image 1140 only contains the third object 1030. Thus, the problem further decomposes into the single object case described above. Using the object detection and extraction method for the single object case, the second object 1020 is segregated and extracted from the left sub-sub-image 1130 and the third object 1030 is segregated and extracted from the right sub-sub-image 1140.

Additional Examples

FIGS. 12A–F illustrate several configurations of objects within images on which the object detection and extraction method can be used. In general, a data disparity or gap in the P(j) or Q(i) function of a scanned image will allow the image to be divided into sub-images. Moreover, these sub-images often can be similarly decomposed. The result is that in a majority of the cases where rectangular objects (such as photographs and receipts) are scanned the object detection and extraction method described herein will divide the scanned image into component sub-images that each sub-image contains only a single rectangle. It should be noted, however, that it is possible to arrange multiple objects in such a fashion that there are no gaps present in the image functions (P(j) or Q(i)) and an image cannot be further divided. For example, in FIG. 12A the objects are arranged within the scanned image such that no gaps are present in the P(j) or Q(i) function. Thus, the image cannot be divided and the above-described object detection and extraction method cannot be used. However, for the vast majority of cases (for example, the cases shown in FIGS. 12B–F), the object detection and extraction method will segregate and extract each object by processing and dividing each image into sub-images until each sub-image contains only a single rectangle.

In these working examples, the approach includes calculating P(j) and Q(i) functions for a given image. In order to simplify the problem, the P(j) function and the Q(i) function are analyzed to determine whether any data disparities or gaps are present. These gaps correspond to the area in the graphs of P(j) or Q(i) where the value of P(j) or Q(i) is less than the neighboring areas. If gaps are found, then the image is divided or separated into sub-images around either side of the gap. This division and separation occurs until one of two possibilities occurs: (1) an image contains only a single object; or (2) no further gaps in the P(j) and Q(i) functions are found.

When an image is found that contains only a single object, the value of P(j) and Q(i) are determined. If the object is a rectangle or square, the P(j) function and the Q(i) function will correspond closely to a trapezoid. Since two rectangles are capable of generating the same P(j) and Q(i) data, each rectangle is checked against the image data to determine whether either of them matches the data. If one of the rectangles matches the data then it is determined that the rectangle corresponds to the location of the object. Otherwise, it is determined that object has been found in the given image. In either case the division and separation of images and sub-images continues until no more sub-images remain. Because the same processing is applied to image and its sub-images, the object extraction method describe above can be efficiently implemented recursively.

By way of example and not limitation, the following pseudo-code describes one possible implementation of the object detection and extraction method:

```
function procMult(Im);
  i0 = 0; j0 = 0; i1 = leni; j1 = lenj;
  [P, Q] = getProjections(Im);
  [gapsi, gapsj] = getGaps(P, Q);
  if ((length(gapsi)-2) + (length(gapsj)-2) < 1)
    drawObject(Im, P, Q);
  else
    for m = 0:length(gapsi)-2
      for n = 0:length(gapsj)-2
        procMult(Im(gapsi(m):gapsi(m+1), gapsj(n):gapsj(n+1))
      end
    end
  end
```

Where the called functions are as follows:

| | |
|---|---|
| [P, Q] = getProjections(Im) | routine to calculate P(j), Q(i) over image region |
| [gapsi, gapsj] = getGaps(P, Q) | determine position of any gaps in P(j), Q(i). The response to the image in FIG. 7 would be gapsi = [0, $i_{max}$] and gapsj [0, $j_{max}$], and to FIG. 9 would be gapsi = [0, $i_{max}$] and gapsj = [0 $j_0$ $j_{max}$]. |
| drawObject(Im, P, Q) | Examine P(j) and Q(i) for trapezoids, estimate their parameters and determine whether any rectangle fits the data. If so, add vertices to global list. |

Implementation Issues

The above discussion assumes that there is no confusion between background pixels and data pixels. For example, assume that every image pixel can be classified as an data pixel if |Im(i,j)−b|>threshold, and a background pixel otherwise. In this ideal situation, the trapezoids formed by graphing P(j) and Q(i) will be ideal trapezoids and the inflection points can be easily be determined with confidence.

In practice, however, it may not be possible to classify all pixels accurately. This inaccuracy has the effect that the trapezoids may differ from the ideal due to, for example, noise. Fortunately, however, since the image functions (P(j) and Q(i)) are defined as a sum is taken over all of the pixels in a direction, the P(j) and Q(i) functions are inherently robust. In addition, because the top line of these trapezoids typically are the most common value, this is easy to estimate robustly from a histogram. The inflection points then can be estimated as the points that are within thresholds of this common value. Moreover, when determining whether there are data disparities or gaps present in the P(j) and Q(i) functions, it generally happens that noise or mis-estimation of the background color ensures that P(j) and Q(i) seldom exactly equal to zero.

Although the image functions (P(j) and Q(i)) used in this working example were defined as the sum of the data pixels in two or more different directions, it should be noted that other definitions also may be used. By way of example, an image function, R(j), may be defined to equal the column position of the rightmost data pixel minus the column position of the leftmost data pixel, and another image function, S(i), may be defined to equal the row position of the topmost data pixel minus the row position of the bottommost data pixel. In this situation, R(j) and S(i) would also enable the object detection and extraction system and method to operate efficiently. In fact, in the absence of noise, it should be noted that P(j)=R(j) and Q(i)=S(i) when the image consists of a single rectangular object.

VI. Additional Embodiments

In one embodiment the object detection and extraction process is applied to a sub-sampled version of the image. The advantage using a sub-sampled version of the image is that this avoids dealing with high-resolution image data.

In another embodiment, once it is determined that a sub-image probably contains only a single object, a fitting algorithm is used to estimate the best fit of a trapezoid to the P(j) and Q(i) functions. Then, the inflection points (or knee points) of the trapezoid that best fits the data are used to form estimates of the vertices of the object.

In still another embodiment, once an estimate of the vertices of the single object in a sub-image has been found, the best fit of a single object to the contents of the sub-image is determined. This is achieved by using a technique that determines a rectangular object that minimizes the squared mean (or other metric) between the actual data in the sub-image and the proposed rectangular fit.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A method for detecting and extracting objects in an image, comprising:
    classifying each pixel within the image to obtain a pixel classification data;
    defining an image function to process the pixel classification data;
    dividing the image into sub-images based on disparities in the image function; and
    processing the sub-images to determine a size, an orientation and a position for each of the objects.

2. The method as set forth in claim 1, further comprising classifying each pixel as one of: (a) a data pixel; (b) a background pixel.

3. The method as set forth in claim 1, wherein the image function is calculated in different directions.

4. The method as set forth in claim 1, wherein the image is a scanned image and the objects are rectangular objects.

5. The method as set forth in claim 1, further comprising repeating the classification of pixels, calculation the image function, and dividing of the image until one or more of the following occurs: (a) the image contains a single object; (b) the image can no longer be divided.

6. The method as set forth in claim 5, further comprising determining that the image can no longer be divided by finding no disparities the image function.

7. The method as set forth in claim 2, further comprising:
    defining the image function as the sum of data pixels in a certain direction;
    calculating the image function in a first direction to generate a first data set; and
    calculating the image function in a second direction to generate a second data set.

8. The method as set forth in claim 7, further comprising defining the first direction and the second direction as orthogonal.

9. The method as set forth in claim 7, further comprising searching for disparities in the image function in the first direction and the image function in the second direction.

10. The method as set forth in claim 9, further comprising defining a data disparity line as the region where the number of data pixels in the image function are less as compared to surrounding regions.

11. A process for determining a size, an orientation and a position of rectangular objects in a two-dimensional image, comprising:
    defining an image function having a recognizable characteristic when used on a single rectangular object;
    calculating the image function in two different directions of the two-dimensional image;
    using the image function to determine the size, the orientation and the position of the rectangular objects in the two-dimensional image.

12. The process of claim 11, wherein the recognizable characteristic is approximately a trapezoidal shape.

13. The process of claim 11, further comprising calculating the image function along rows and along columns of the two-dimensional image.

14. The process of claim 11, wherein the image function is the sum of data pixels along each of the two different directions.

15. The process of claim 11, further comprising searching for gaps in the image function.

16. The process of claim 15, further comprising:
    determining that gaps are present in the image function; and
    dividing the image into sub-images based on the gaps.

17. The process of claim 16, further comprising iteratively processing each sub-image until one of the following: (a) a sub-image contains a single object; (b) the sub-image cannot be further divided.

18. The process of claim 17, further comprising determining that the sub-image contains a single object by identifying the recognizable characteristic of the image function.

19. The process of claim 18, wherein the recognizable characteristic for a single rectangular object is a trapezoid.

20. The process of claim 17, further comprising determining that the sub-image cannot be further divided by finding no further gaps in the image function.

21. A method for determining a number, a size, an orientation and a position of rectangular objects contained in an image, comprising:
    classifying each pixel within the image as one of: (a) a data pixel; (b) a background pixel;
    calculating an image function along two or more different directions of the image;
    examining the image function to determine whether a disparity is present;
    dividing the image into sub-images if a disparity is found;
    repeating the calculating, examining and dividing actions for each of the sub-images; and
    examining the image and each of the sub-images to determine if the image functions have a recognizable shape.

22. The method as set forth in claim 21, wherein dividing the image further comprises dividing the image along a data disparity line.

23. The method as set forth in claim 21, wherein the image is a scanned image.

24. The method as set forth in claim 21, wherein the image function is a one-dimensional function.

25. The method as set forth in claim 21, wherein calculating an image function further comprises determining a sum of data pixels along each of the different directions.

26. The method as set forth in claim 21, further comprising determining that a sub-image contains a single object based on whether a disparity is found.

27. The method as set forth in claim 26, further comprising using a fitting algorithm to estimate a best fit of a trapezoid to the image function in each of the different directions.

28. The method as set forth in claim 27, further comprising forming an estimate of vertices of the rectangular objects using inflection points of the trapezoid.

29. A method for detecting and segregating rectangular objects in a two-dimensional image, comprising:
    defining an image function that sums data pixels contained in the two-dimensional image along two orthogonal directions;
    decomposing the two-dimensional image into a plurality of sub-images based gaps in the data pixels until one of the following occurs: (a) each of the plurality of sub-images contains a single rectangular object; (b) a sub-image cannot be further decomposed; and using the image function to find a size, an orientation and a position for each of the single rectangular objects in the plurality of sub-images.

30. The method of claim 29, further comprising determining that a sub-image contains a single rectangular object by recognizing the shape characteristic of the image function of the object.

31. The method of claim 30, wherein the shape characteristic is approximately a trapezoid shape.

32. The method of claim 29, further comprising determining an estimate of vertices of a single rectangular object in a sub-image.

33. The method of claim 32, further comprising determining a best fit of the single rectangular object to contents of the sub-image.

34. The method of claim 33, wherein determining a best fit further comprises determining a rectangular object that minimizes a squared mean between data in the sub-image and a proposed rectangular fit.

35. The method as set forth in claim 29, wherein defining an image function that sums data pixels further comprises:
    summing data pixels along each row of the two-dimensional image; and
    summing data pixels along each column of the two-dimensional image.

36. An object detection and extraction system for processing digital image data, comprising:
    a data pixel detection module that classifies each pixel within the digital image data and defines an image function;
    a segmentation module that is capable of dividing the digital image data into smaller sub-images based on disparities in the image function; and
    a single object extraction module that processes the sub-images to detect a number, a size, an orientation and a position of objects within the digital image data.

37. The object detection and extraction system as set forth in claim 36, wherein the object within the digital image data have rectangular shape.

38. The object detection and extraction system as set forth in claim 36, wherein the digital image data is a scanned two-dimensional image.

39. The object detection and extraction system as set forth in claim 36, wherein the single object extraction module further comprises a pixel analysis module that classifies pixels within a sub-image as one of: (a) data pixel; (b) background pixel.

40. The object detection and extraction system as set forth in claim 39, further comprising a verification module that compares estimated coordinates received from the pixel analysis module to the digital image data.

41. The object detection and extraction system as set forth in claim 36, further comprising an object location output module that outputs coordinates of the objects within the digital image data.

* * * * *